United States Patent Office 2,867,630
Patented Jan. 6, 1959

2,867,630

6-FLUORO ANDROSTENES

Raymond L. Pederson and Milton E. Herr, Kalamazoo, John C. Babcock, Portage Township, Kalamazoo County, and J. Allan Campbell and John A. Hogg, Kalamazoo Township, Kalamazoo County, Mich., assignors to The Upjohn Company, Kalamazoo, Mich., a corporation of Michigan No Drawing. Application June 9, 1958
Serial No. 740,530

38 Claims. (Cl. 260—397.3)

This invention relates to new 6α- and 6β-fluoro steroids and is more particularly concerned with 6-fluoro-17β-hydroxy-1,4-androstadien-3-ones and the 17-acylates thereof, 6-fluoro-17β-hydroxy-1,4-androstadiene-3,11-diones and the 17-acylates thereof, 6-fluoro-11β,17β-dihydroxy-1,4-androstadien-3-ones and the 17-acylates thereof, 6-fluoro-1,4-androstadiene-3,17-diones, 6-fluoro-1,4-androstadiene-3,11,17-triones, 6-fluoro-11β-hydroxy-1,4-androstadiene-3,17-diones, 6-fluoroestradiols and the 17-acylates thereof, 6-fluoro-11-ketoestradiols and the 17-acylates thereof, 6-fluoro-11β-hydroxyestradiols and the 17-acylates thereof, 6-fluoroestrones, 6-fluoro-11-ketoestrones, 6-fluoro-11β-hydroxyestrones, and methods used in the preparation thereof.

The novel steroids of this invention, the compounds of Formulae II and III, depicted and described in greater detail below, possess useful therapeutic properties. The compounds of Formula II exhibit anabolic, antiestrogenic and androgenic activity. The compounds of Formulae II and III possess antiosteoporotic, gonadotropin inhibiting, central nervous system regulating and blood lipid clearing properties. The compounds of Formulae II and III are useful in the treatment of debilitated, osteoporotic, hypogonadal, and atherosclerotic conditions.

Administration of the steroids of Formulae II and III can be in conventional dosage forms, such as pills, tablets, capsules, syrups or elixirs for oral use, or in liquid forms which are adaptable to the natural and synthetic steroid hormones for injectable products.

The novel compounds of this invention are prepared according to the following reaction scheme:

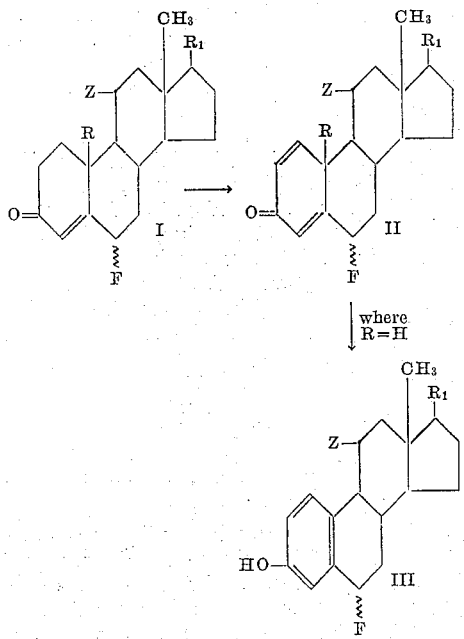

wherein R represents methyl or hydrogen, $R_1$ represents hydroxy, OAcyl or keto and Z represents hydrogen, hydroxyl, or keto. The term Acyl as used herein refers to an acyl radical of an organic carboxylic acid, preferably a hydrocarbon carboxylic acid, containing from one to twelve carbon atoms, inclusive.

In this application the wavy line $(\int)$ appearing at the 6-position is a generic expression including the alpha (α) and beta (β) configuration.

The starting steroids for the processes of the present invention, the compounds of Formula I, e. g., 6-fluoro-17β-hydroxy-4-androsten-3-ones, 6-fluoro-17β-hydroxy-19-nor-4-androsten-3-ones, 6-fluoro-17β-hydroxy-4-androstene-3,11-diones, 6-fluoro-17β-hydroxy-19-nor-4-androstene-3,11-diones, 6-fluoro-11β,17β-dihydroxy-4-androsten-3-ones, 6-fluoro-11β,17β-dihydroxy-19-nor-4-androsten-3-ones, the 17-acylates thereof, 6-fluoro-4-androstene-3,17-diones, 6-fluoro-19-nor-4-androstene-3,17-diones, 6-fluoro-4-androstene-3,11,17-triones, 6-fluoro-19-nor-4-androstene-3,11,17-triones, 6-fluoro-11β-hydroxy-4-androstene-3,17-diones and 6-fluoro-11β-hydroxy-19-nor-4-androstene-3,17-diones are disclosed in our copending application Serial No. 716,026, filed November 29, 1957.

One of the processes of the present invention comprises the fermentative dehydrogenation of the compounds of Formula I (where R is methyl), for example, 6-fluoro-17β-hydroxy-4-androsten-3-ones and the 17-acylates thereof, 6-fluoro-17β-hydroxy-4-androstene-3,11-diones and the 17-acylates thereof, 6-fluoro-11β,17β-dihydroxy-4-androsten-3-ones and the 17-acylates thereof, 6-fluoro-4-androstene-3,17-diones, 6-fluoro-4-androstene-3,11,17-triones and 6-fluoro-11β-hydroxy-4-androstene-3,17-diones to obtain the compounds of Formula II (where R is methyl), for example, 6-fluoro-17β-hydroxy-1,4-androstadien-3-ones, 6-fluoro-17β-hydroxy-1,4-androstadiene-3,11-diones, 6-fluoro-11β,17β-dihydroxy-1,4-androstadien-3-ones, 6-fluoro-1,4-androstadiene-3,17-diones, 6-fluoro-1,4-androstadiene-3,11,17-triones and 6-fluoro-11β-hydroxy-1,4-androstadiene-3,17-diones, respectively.

Fermentative dehydrogenation of the compounds of Formula I (where R is methyl) comprises the use of microorganisims such as Septomyxa, Corynebacterium, Fusarium, and the like, under fermentation conditions well known in the art (e. g., U. S. 2,602,769) and furthermore illustrated in the examples below.

When the compounds of Formula I (where R is methyl) contain an 11β-hydroxy group, such as 6-fluoro-11β,17β-dihydroxy-4-androsten-3-ones and the 17-acylates thereof and 6-fluoro-11β-hydroxy-4-androstene-3,17-diones, and Septomyxa is used to effect the dehydrogenation, it is found to be advantageous to use with the substrate and medium a steroid promoter, such as progesterone, 3-ketobisnor-4-cholen-22-al, 3-ketobisnorcholenic acid, 11β,21-dihydroxy-1,4,17(20)-pregnatrien-3-one, and the like.

When the starting steroid is capable of possessing a 17-hydroxy or 17-ester group, it is preferred to use a steroid possessing the 17-hydroxyl group since dehydrogenation using microorganisms generally effects saponification of the 17-ester group. However, the 17-acylates, for example, the 17-acetate, the 17-propionate, and the like of 6-fluoro-17β-hydroxy-4-androsten-3-ones, 6-fluoro-17β-hydroxy-4-androstene-3,11-diones, and 6-fluoro-11β,17β-dihydroxy-4-androsten-3-ones can be used as starting material.

If desired, those compounds of Formula II (where R is methyl) which contain a 17-hydroxy group, such as 6-fluoro-17β-hydroxy-1,4-androstadiene-3-ones, 6-fluoro-17β-hydroxy-1,4-androstadiene-3,11-diones and 6-fluoro-11β,17β-dihydroxy-1,4-androstadien-3-ones, can be acylated to obtain the corresponding 17-acylates thereof. Suitable esterifying agents are organic carboxylic acids, particularly hydrocarbon carboxylic acids, containing from one to twelve carbon atoms, inclusive, or the acid anhydrides and acid halides thereof. For example, a saturated straight-chain aliphatic acid, e. g., formic, acetic, propionic, butyric, valeric, hexanoic, lauric, a saturated branched-chain aliphatic acid, e. g., trimethylacetic, isobutyric, isovaleric, tertiary butylacetic, a cycloaliphatic saturated acid, e. g., β-cyclopentylpropionic, cyclohexane-carboxylic, cyclohexylacetic, an alkaryl acid, e. g., benzoic, phenylacetic, β-phenylpropionic, o- m-, and p-toluic, a saturated dibasic acid (which can be converted into water-soluble, e. g., sodium, salts), e. g., succinic, adipic; a monobasic unsaturated acid, e. g., acylic, crotonic, undecylenic, propiolic, undecolic, cinnamic; dibasic unsaturated acids (which can be converted into water-soluble, e. g., sodium, salts), e. g., maleic and citraconic, or the acid anhydrides and acid halides thereof, can be used to acylate the compounds of Formula II (where R is methyl) which contain a 17-hydroxy group. If the esterifying agent is the free acid, the reaction is preferably effected in the presence of an esterification catalyst, for example, p-toluenesulfonyl chloride, trifluoroacetic anhydride, p-toluenesulfonic acid, trifluoroacetic acid, sulfuric acid, and the like. If the acylating agent is an acid chloride or anhydride, the reaction is preferably carried out in the presence of a tertiary base, for example, pyridine, dimethylaniline, and the like.

If the corresponding acylating agent is solid, an inert solvent such as toluene, xylene or dioxane can be added to effect solution and to provide a liquid esterification medium.

Alternatively the compounds of Formula I (where R is methyl) which contain a 17-hydroxyl or 17-acylate group, such as 6-fluoro-17β-hydroxy-4-androsten-3-ones and the 17-acylates thereof, 6-fluoro-17β-hydroxy-4-androstene-3,11-diones and the 17-acylates thereof and 6-fluoro-11β,17β-dihydroxy-4-androsten-3-ones and the 17-acylates thereof, can be subjected to chemical dehydrogenation with selenium dioxide or selenious acid, according to procedures well known in the art and furthermore illustrated in the examples below, to produce the compounds of Formula II (where R is methyl) which contain a 17-hydroxyl or 17-acylate group, such as 6-fluoro-17β-hydroxy-1,4-androstadien-3-ones and the 17-acylates thereof, 6-fluoro-17β-hydroxy-1,4-androstadiene-3,11-diones and the 17-acylates thereof, 6-fluoro-11β,17β-dihydroxy-1,4-androstadien-3-ones and the 17-acylates thereof.

Fermentative dehydrogenation of the compounds of Formula I (where R is hydrogen), for example, 6-fluoro-17β-hydroxy-19-nor-4-androsten-3-ones and the 17-acylates thereof, 6-fluoro-17β-hydroxy-19-nor-4-androstene-3,11-diones and the 17-acylates thereof, 6-fluoro-11β,17β-dihydroxy-19-nor-4-androsten-3-ones and the 17-acylates thereof, 6-fluoro-19-nor-4-androstene-3,17-diones, 6-fluoro-19-nor-4-androstene-3,11,17-triones and 6-fluoro-11β-hydroxy-19-nor-4-androstene-3,17-diones, is carried out in the same manner as described above for the fermentative dehydrogenation of the compounds of Formula I (where R is methyl). The compounds of Formula II (where R is hydrogen) thus formed are unstable and spontaneously rearrange to produce the compounds of Formula III, for example 6-fluoro-estradiols, 6-fluoro-11-ketoestradiols, 6-fluoro-11β-hydroxyestradiols, 6-fluoroestrones, 6-fluoro-11-ketoestrones and 6-fluoro-11β-hydroxyestrones.

When the compounds of Formula I (where R is hydrogen) contain an 11β-hydroxy group and Septomyxa is used to effect the dehydration, it is also found to be advantageous to use a steroid promoter, such as those named above for the dehydrogenation of the compounds of Formula I (where R is methyl).

If the 17-acylates of 6-fluoro-17β-hydroxy-19-nor-4- androsten-3-ones, 6-fluoro-17β-hydroxy-19-nor-4-androstene-3,11-diones and 6-fluoro-11β,17β-dihydroxy-19-nor-4-androsten-3-ones are used as starting materials, saponification of the 17-ester group is generally effected.

The 17β-acylates of the 6-fluoroestradiols, 6-fluoro-11-ketoestradiols and 6-fluoro-11β-hydroxyestradiols can then be obtained in the following manner: The 6-fluoroestradiols, 6-fluoro-11-ketoestradiols and 6-fluoro-11β-hydroxyestradiols can be acylated, according to the procedures described above for the acylation of 6-fluoro-17β-hydroxy-1,4-androstadien-3-ones, 6-fluoro-17β-hydroxy-1,4-androstadiene-3,11-diones, and 6-fluoro-11β,17β-dihydroxy-1,4-androstadien-3-ones, to obtain the corresponding 3,17β-diacylates of 6-fluoroestradiols, 6-fluoro-11-ketoestradiols and 6-fluoro-11β-hydroxyestardiols. The said 3,17β-diacylates are then converted to the 17β-acylates of 6-fluoroestradiols, 6-fluoro-11-ketoestradiols and 11β-hydroxyestradiols, by substituting the said 3,17β-diacylates for the estradiol 3,17β-diacylate disclosed in Example 2 of U. S. Patent 2,611,733 and following the procedure disclosed therein selectively saponifying the acyl group at the 3-position. The preferred method for the preparation of the said 3,17β-diacylates is to follow the procedure disclosed in Example 1 of U. S. Patent 2,611,733, substituting the 6-fluoroestradiols, 6-fluoro-11-ketoestradiols, 6-fluoro-11β-hydroxyestradiols and the appropriate acid halide for the estradiol and acid halide disclosed therein.

Chemical dehydrogenation of the compounds of Formula I (where R is hydrogen) which contain a 17-hydroxyl or 17-acylate group, such as 6-fluoro-17β-hydroxy-19-nor-4-androsten-3-ones and the 17-acylates thereof, 6-fluoro-17β-hydroxy-19-nor-4-androstene - 3,11 - diones and the 17-acylates thereof, 6-fluoro-11β,17β-dihydroxy-9-nor-4-androsten-3-ones and the 17-acylates thereof, to obtain the compounds of Formula III which contain a 17-hydroxy or 17-acylate group is carried out in the same manner described above for the conversion of the compounds of Formula I (where R is methyl) which contain a 17-hydroxy or 17-acylate group to the compounds of Formula II (where R is methyl) which contain a 17-hydroxy or 17-acylate group. Here, as in the fermentative dehydrogenation, the compounds of Formula II (where R is hydrogen) which contain a 17-hydroxy or 17-acylate group are unstable and spontaneously rearrange to produce the compounds of Formula III which contain a 17-hydroxy or 17-acylate group, such as 6-fluoroestradiols and the 17-acylates thereof, 6-fluoro-11-ketoestradiols and the 17-acylates thereof, and 6-fluoro-11β-hydroxyestradiols and the 17-acylates thereof.

The foregoing compounds of Formulae I, II and III are all characterized by the presence of a 6-fluoro substituent. It should be noted that the configuration of the fluorine at the 6-position can be either 6α or 6β. Thus, substituting a 6β-fluoro steroid as the starting material and following the procedures hereinbefore described and as exemplified below, while maintaining near neutral reaction conditions, there is produced as the final product of each example the corresponding 6β-epimer. Where the 6β-epimer or a mixture predominating therein is employed as the starting material, any subsequent reaction product can be isolated either as the 6β-epimer or the aforesaid mixture of 6α- or 6β-epimers. A 6α-epimerized product can be obtained by treatment of the 6β-epimer (or a mixture of the 6α- and 6β-epimers) of the compounds of Formula II at temperatures of zero degrees centigrade, or slightly higher or lower temperatures, in an organic solvent, such as chloroform, methylene chloride, ether, and the like, and in the presence of a protropic agent (proton-donating agent) such as alcohols, organic acids, and the like, with a mineral acid, such as hydrogen chloride. The mixture should preferably be maintained at a temperature of zero degrees centigrade, although slightly higher or lower temperatures can be used, during the addition of the acid. The reaction mixture can then be washed with successive portions of dilute alkali and water, and then dried and evaporated under reduced pressure. The 6α-fluoro products can be recovered from the crude reaction product and purified by recrystallization.

Alternatively, the epimerization of the compounds of Formula II can be accomplished with alkali. Bases, for example, solutions of sodium hydroxide and potassium hydroxide, may be used to treat the 6β-epimer in solution in an organic solvent, such as methanol, to produce the 6α-epimer.

The following examples are illustrative of the process and products of the present invention, but are not to be construed as limiting.

In the examples which follow, the Roman numeral following the name of a compound is used to indicate the relation of the compound to the reaction scheme depicted and described above.

EXAMPLE 1

*6α-fluoro-11β-hydroxy-1,4-androstadiene-3,17-dione (II) (biological dehydrogenation)*

Three 100-milliliter portions of a medium, in 250-milliliter Erlenmeyer flasks, containing one percent glucose, two percent corn steep liquor (sixty percent solids) and tap water, are adjusted to a pH of 4.9. This medium is sterilized for 45 minutes at fifteen pounds per square inch pressure and inoculated with a one to two day vegetative growth of Septomyxa affinis A. T. C. C. 6737. The Erlenmeyer flasks are shaken at room temperature (about 26 to 28 degrees centigrade) for a period of three days. At the end of this period this 300-milliliter volume is used as an inoculum for five liters of the same glucose-corn steep liquor medium which in addition contains five milliliters of an antifoam compound (a mixture of lard oil and octadecanol). The fermentor is placed into the water-bath, adjusted to 28 degrees centigrade and the contents stirred (300 R. P. M.) and aerated (0.3 liter air per minute to five liters of beer). After twenty hours of incubation, when a good growth has been developed, one gram of 6α-fluoro-11β-hydroxy-4-androstene-3,17-dione (I) plus one-half gram of 3-ketobisnor-4-cholen-22-al dissolved in sixteen milliliters of dimethylformamide is added and the incubation carried out at the same temperature (28 degrees centigrade) and aeration for a period of 48 hours (final pH 8.3). The mycelium is filtered off and extracted with three 200-milliliter portions of acetone. The beer is extracted with three one-liter portions of methylene chloride and thereupon the acetone extracts and the extracts of the beer are combined, dried over anhydrous sodium sulfate and evaporated and the resulting residue chromatographed over a Florisil anhydrous magnesium silicate column. The chromatographic column is eluted with Skellysolve B hexanes plus increasing proportions of acetone of from six to sixteen percent. The fractions thus obtained are evaporated to dryness leaving residues. The residues are subjected to infrared absorption analysis and those residues exhibiting the characteristic bands of 6α-fluoro-11β-hydroxy-1,4-androstadiene-3,17-dione are combined and recrystallized from methylene chloride-Skellysolve B hexanes to give 6α-fluoro-11β-hydroxy-1,4-androstadiene-3,17-dione (II), a crystalline solid.

Instead of Septomyxa, species of other genera such as Corynebacterium, Didymella, Calonectria, Alternaria, Colletotrichum, Cylindrocarpon, Ophiobolus, Fusarium, Listeria, Erysipelothrix, Mycobacterium, Tricothecium, Leptosphaeria, Cucurbitaria, Nocardia, and enzymes of fungi of the family Tuberculariaceae can be used to introduce a $\Delta^1$-bond into 6α-fluoro-11β-hydroxy-4-androstene-3,17-dione.

EXAMPLE 2

*6α-fluoro-1,4-androstadiene-3,11,17-trione (II) (biological dehydrogenation)*

Three 100-milliliter portions of a medium, in 250-milliliter Erlenmeyer flasks, containing one percent glucose, two percent corn steep liquor (sixty percent solids) and tap water, are adjusted to a pH of 4.9. This medium is sterilized for 45 minutes at fifteen pounds per square inch pressure and inoculated with a one to two day vegetative growth of Septomyxa affinis A. T. C. C. 6737. The Erlenmeyer flasks are shaken at room temperature (about 26 to 28 degrees centigrade) for a period of three days. At the end of this period this 300-milliliter volume is used as an inoculum for five liters of the same glucose-corn steep liquor medium which in addition contains five milliliters of an antifoam compound (a mixture of lard oil and octadecanol). The fermentor is placed into the water-bath, adjusted to 28 degrees centigrade and the contents stirred (300 R. P. M.) and aerated (0.3 liter air per minute to five liters of beer). After twenty hours of incubation, when a good growth has been developed, one gram of 6α-fluoro-4-androstene-3,11,17-trione (I) in sixteen milliliters of dimethylformamide is added and the incubation carried out at the same temperature (28 degrees centigrade) and aeration for a period of 48 hours (final pH 8.3). The mycelium is filtered off and extracted with three 200-milliliter portions of acetone. The beer is extracted with three one-liter portions of methylene chloride and thereupon the acetone extracts and the extracts of the beer are combined, dried over anhydrous sodium sulfate and evaporated and the resulting residue chromatographed over a Florisil anhydrous magnesium silicate column. The chromatographic column is eluted with Skellysolve B hexanes plus increasing proportions of acetone of from six to sixteen percent. The fractions thus obtained are evaporated to dryness leaving residues. The residues are subjected to infrared absorption analysis and those residues exhibiting the characteristic bands of 6α-fluoro-1,4-androstadiene-3,11,17-trione are combined and recrystallized from methylene chloride-Skellysolve B hexanes to give 6α-fluoro-1,4-androstadiene-3,11,17-trione (II), a crystalline solid.

Instead of Septomyxa, species of other genera such as those disclosed in Example 1 can be used to introduce a $\Delta^1$-bond into 6α-fluoro-4-androstene-3,11,17-trione.

EXAMPLE 3

*6α-fluoro-17β-hydroxy-1,4-androstadiene-3,11-dione (II) (biological dehydrogenation)*

Three 100-milliliter portions of a medium, in 250-milliliter Erlenmeyer flasks, containing one percent glucose, two percent corn steep liquor (sixty percent solids) and tap water, are adjusted to a pH of 4.9. This medium is sterilized for 45 minutes at fifteen pounds per square inch pressure and inoculated with a one to two day vegetative growth of Septomyxa affinis A. T. C. C. 6737. The Erlenmeyer flasks are shaken at room temperature (about 26 to 28 degrees centigrade) for a period of three days. At the end of this period this 300-milliliter volume is used as an inoculum for five liters of the same glucose-corn steep liquor medium which in addition contains five milliliters of an antifoam compound (a mixture of lard oil and octadecanol). The fermentor is placed into the water-bath, adjusted to 28 degrees centigrade and the contents stirred (300 R. P. M.) and aerated (0.3 liter air per minute to five liters of beer). After twenty hours of incubation, when a good growth has been developed, one gram of 6α-fluoro-17β-hydroxy-4-androstene-3,11-dione (I) in sixteen milliliters of dimethylformamide is added and the incubation carried out at the same temperature (28 degrees centigrade) and aeration for a period of 48 hours (final pH 8.3). The mycelium is filtered off and extracted with three 200-milliliter portions of acetone. The beer is extracted with three one-liter portions of methylene chloride and thereupon the acetone extracts and the extracts of the beer are combined, dried over anhydrous sodium sulfate and evaporated and the resulting residue chromatographed over a Florisil anhydrous magnesium silicate column. The chromatographic column is eluted with Skellysolve B hexanes plus increasing proportions of acetone of from six to sixteen percent. The fractions thus obtained are evaporated to dryness leaving residues. The residues are subjected to infrared absorption analysis and those residues exhibiting the characteristic bands of 6α-fluoro-17β-hydroxy-1,4-androstadiene-3,11-dione are combined and recrystallized from methylene chloride-Skellysolve B hexanes to give 6α-fluoro-17β-hydroxy-1,4-androstadiene-3,11-dione (II), a crystalline solid. Instead of Septomyxa, species of other genera such as those disclosed in Example 1 can be used to introduce a $\Delta^1$-bond into 6α-fluoro-17β-hydroxy-4-androstene-3,11-dione.

Instead of 6α-fluoro-17β-hydroxy-4-androstene-3,11-dione, the 17-esters thereof can be used such as the 17-acetate, the 17-propionate, the 17-butyrate, the 17-isobutyrate, and the like. However, in these cases the ester group is generally saponified during the fermentation process.

Example 3A

*6α-fluoro-17β-hydroxy-1,4-androstadiene-3,11-dione 17-propionate (II)*

0.85 gram of 6α-fluoro-17β-hydroxy-1,4-androstadiene-3,11-dione is dissolved in three milliliters of pyridine. This solution is then treated with 1.5 milliliters of propionic anhydride and allowed to stand for five hours. The reaction mixture is cooled and nine milliliters of water is added dropwise with stirring, causing the precipitation of a solid. After one hour the mixture is filtered and the precipitate dried in vacuo at seventy degrees centigrade to give 6α-fluoro-17β-hydroxy-1,4-androstadiene-3,11-dione 17-propionate (II), a crystalline solid.

Similarly, by allowing 6α-fluoro-17β-hydroxy-1,4-androstadiene-3,11-dione to react with the appropriate hydrocarbon carboxylic acids, or the acid anhydrides and acid halides thereof, there are produced other 17-acylates of 6α-fluoro-17β-hydroxy-1,4-androstadiene-3,11-dione such as 6α-fluoro-17β-hydroxy-1,4-androstadiene-3,11-dione 17-formate, 6α-fluoro-17β-hydroxy-1,4-androstadiene-3,11-dione 17-acetate, 6α-fluoro-17β-hydroxy-1,4-androstadiene-3,11-dione 17-butyrate, 6α-fluoro-17β-hydroxy-1,4-androstadiene-3,11-dione 17-valerate, 6α-fluoro-17β-hydroxy-1,4-androstadiene-3,11-dione 17-hexanoate, 6α-fluoro-17β-hydroxy-1,4-androstadiene-3,11-dione 17-laurate, 6α-fluoro-17β-hydroxy-1,4-androstadiene-3,11-dione 17-trimethylacetate, 6α-fluoro-17β-hydroxy-1,4-androstadiene-3,11-dione 17-isobutyrate, 6α-fluoro-17β-hydroxy-1,4-androstadiene-3,11-dione 17-isovalerate, 6α-fluoro-17β-hydroxy-1,4-androstadiene-3,11-dione 17-tertiary butylacetate, 6α-fluoro-17β-hydroxy-1,4-androstadiene-3,11-dione 17-(β-cyclopentylpropionate), 6α-fluoro-17β-hydroxy-1,4-androstadiene-3,11-dione 17-cyclohexane-carboxylate, 6α-fluoro-17β-hydroxy-1,4-androstadiene-3,11-dione 17-cyclohexylacetate, 6α-fluoro-17β-hydroxy-1,4-androstadiene-3,11-dione 17-benzoate, 6α-fluoro-17β-hydroxy-1,4-androstadiene-3,11-dione 17-phenylacetate, 6α-fluoro-17β-hydroxy-1,4-androstadiene-3,11-dione 17-(β-phenylpropionate), 6α-fluoro-17β-hydroxy-1,4-androstadiene-3,11-dione 17-(o-, m-, p-toluate), 6α-fluoro-17β-hydroxy-1,4-androstadiene-3,11-dione 17-hemisuccinate, 6α-fluoro-17β-hydroxy-1,4-androstadiene-3,11-dione 17-hemiadipate, 6α-fluoro-17α-hydroxy-1,4-androstadiene-3,11-dione 17-acrylate, 6α-fluoro-17β-hydroxy-1,4-androstadiene-3,11-dione 17-crotonate, 6α-fluoro-17β-hydroxy-1,4-androstadiene-3,11-dione 17-undecylenate, 6α-fluoro-17β-hydroxy-1,4-androstadiene-3,11-dione 17-propiolate, 6α-fluoro-17β-hydroxy-1,4-androstadiene-3,11-dione 17-undecolate, 6α-fluoro-17β-hydroxy-1,4-androstadiene-3,11-dione 17-cinnamate, 6α-fluoro-17β-hydroxy-1,4-androstadiene-3,11-dione 17-maleate, 6α-fluoro-17β-hydroxy-1,4-androstadiene-3,11-dione 17-citraconate.

Example 4

*6α-fluoro-17β-hydroxy-1,4-androstadien-3-one (II) (chemical dehydrogenation)*

A mixture of 0.918 gram (0.003 mole) of 6α-fluoro-17β-hydroxy-4-androsten-3-one (I) dissolved in eighteen milliliters of tertiary butyl alcohol and 0.18 milliliter of acetic acid was heated together with 0.21 gram of purified selenious acid at reflux under stirring for five hours. Thereafter 0.12 gram of purified selenious acid was added and the mixture heated under reflux, with stirring, for a further period of sixteen hours. The mixture was then cooled, filtered and the filtrate concentrated to dryness in vacuo. The residue was dissolved in fifty milliliters of methylene chloride, washed with water, twice with saturated sodium bicarbonate solution, again with water, dried over sodium sulfate and evaporated to dryness in vacuo. The residue was dissolved in sixty milliliters of benzene and chromatographed on fifty grams of Florisil (synthetic magnesium silicate). The chromatographic column was eluted as follows:

Fraction 1 (1000 milliliters)—Skellysolve B hexanes plus four percent acetone

Fraction 2 (1000 milliliters)—Skellysolve B hexanes plus six percent acetone

Fractions 3–43 (50-milliliter fractions)—Skellysolve B hexanes plus eight percent acetone The residues from fractions 13 through 37 were identified by infrared absorption and melting point and were combined to give 0.361 gram of product which was recrystallized from methylene chloride-Skellysolve B hexanes to yield 0.308 gram of 6α-fluoro-17β-hydroxy-1,4-androstadiene-3-one (II), melting at 182–184 degrees centigrade.

*Analysis.*—Calcd. for $C_{19}H_{25}FO_2$: C, 74.97; H, 8.08. Found: C, 74.79; H, 8.31.

Substituting 6α-fluoro-17β-hydroxy-4-androsten-3-one 17-acylates for 6α-fluoro-17β-hydroxy-4-androsten-3-one is productive of the corresponding 6α-fluoro-17β-hydroxy-1,4-androstadien-3-one 17-acylates, for example, the 17-acetate, the 17-propionate, the 17-hemisuccinate, the 17-benzoate, and the like.

Example 5

*6α-fluoro-11β,17β-dihydroxy-1,4-androstadien-3-one (II) (chemical dehydrogenation)*

A mixture of 100 milligrams of 6α-fluoro-11β,17β-dihydroxy-4-androsten-3-one (I) dissolved in six milliliters of tertiary butyl alcohol and 0.55 milliliter of acetic acid is heated together with thirty milligrams of selenium dioxide to approximately 75 degrees centigrade under stirring for a period of about 24 hours. Thereafter another thirty-milligram portion of selenium dioxide is added and the mixture heated under continuous stirring for a further period of about 24 hours. The mixture is then cooled, filtered and evaporated. The residue is dissolved in fifty milliliters of methylene chloride, washed with sodium bicarbonate solution, water, dried over sodium sulfate and the solvent is evaporated therefrom. The residue is chromatographed over a Florisil anhydrous magnesium silicate column. The chromatographic column is eluted with Skellysolve B hexanes plus increasing proportions of acetone of from five to twenty percent. The fractions thus obtained are evaporated to dryness leaving residues. The residues are subjected to infrared absorption analysis and those residues exhibiting the characteristic bands of 6α-fluoro-11β,17β-dihydroxy - 1,4 - androstadien - 3 - one are combined and recrystallized from methylene chloride-Skellysolve B hexanes to give 6α-fluoro-11β,17β-dihydroxy-1,4-androstadien-3-one (II), a crystalline solid.

Substituting 6α-fluoro-11β,17β-dihydroxy - 4 - androsten-3-one 17-acylates for 6α-fluoro-11β,17β-dihydroxy-4-androsten-3-one is productive of the corresponding 6α-fluoro-11β,17β-dihydroxy-1,4-androstadien - 3 - one 17-acylates, for example, the 17-acetate, the 17-propionate, the 17-hemisuccinate, the 17-benzoate, and the like.

EXAMPLE 6

6α-fluoroestrone (III) (biological dehydrogenation)

Three 100-milliliter portions of a medium, in 250-milliliter Erlenmeyer flasks, containing one percent glucose, two percent corn steep liquor (sixty percent solids) and tap water, are adjusted to a pH of 4.9. This medium is sterilized for 45 minutes at fifteen pounds per square inch pressure and inoculated with a one to two day vegetative growth of Septomyxa affinis A. T. C. C. 6737. The Erlenmeyer flasks are shaken at room temperature (about 26 to 28 degrees centigrade) for a period of three days. At the end of this period this 300-milliliter volume is used as an inoculum for five liters of the same glucose-corn steep liquor medium which in addition contains five milliliters of an antifoam compound (a mixture of lard oil and octadecanol). The fermentor is placed into the water-bath, adjusted to 28 degrees centigrade and the contents stirred (300 R. P. M.) and aerated (0.3 liter air per minute to five liters of beer). After twenty hours of incubation, when a good growth has been developed, one gram of 6α-fluoro-19-nor-4-androstene-3,17-dione (I) in sixteen milliliters of dimethylformamide is added and the incubation carried out at the same temperature (28 degrees centigrade) and aeration for a period of 48 hours (final pH 8.3). The mycelium is filtered off and extracted with three 200-milliliter portions of acetone. The beer is extracted with three one-liter portions of methylene chloride and thereupon the acetone extracts and the extracts of the beer are combined, dried over anhydrous sodium sulfate and evaporated and the resulting residue chromatographed over a Florisil anhydrous magnesium silicate column. The chromatographic column is eluted with Skellysolve B hexanes plus increasing proportions of acetone of from five to twenty percent. The fractions thus obtained are evaporated to dryness leaving residues. The residues are subjected to infrared absorption analysis and those residues exhibiting the characteristic bands of 6α-fluoroestrone are combined and recrystallized from acetone-hexane to give 6α-fluoroestrone (III), a crystalline solid.

Instead of Septomyxa, species of other genera such as those disclosed in Example 1 can be used to convert 6α-fluoro-19-nor-4-androstene-3,17-dione to 6α-fluoroestrone.

EXAMPLE 7

6α-fluoro-11-ketoestrone (III) (biological dehydrogenation)

Three 100-milliliter portions of a medium in 250-milliliter Erlenmeyer flasks, containing one percent glucose, two percent corn steep liquor (sixty percent solids) and tap water, are adjusted to a pH of 4.9. This medium is sterilized for 45 minutes at fifteen pounds per square inch pressure and inoculated with a one to two day vegetative growth of Septomyxa affinis A. T. C. C. 6737. The Erlenmeyer flasks are shaken at room temperature (about 26 to 28 degrees centigrade) for a period of three days. At the end of this period this 300-milliliter volume is used as an inoculum for five liters of the same glucose-corn steep liquor medium which in addition contains five milliliters of an antifoam compound (a mixture of lard oil and octadecanol). The fermentor is placed into the water-bath, adjusted to 28 degrees centigrade and the contents stirred (300 R. P. M.) and aerated (0.3 liter air per minute to five liters of beer). After twenty hours of incubation, when a good growth has been developed one gram of 6α-fluoro-19-nor-4-androstene-3,11,17-trione in sixteen milliliters of dimethylformamide is added and the incubation carried out at the same temperature (28 degrees centigrade) and aeration for a period of 48 hours (final pH 8.3). The mycelium is filtered off and extracted with three 200-milliliter portions of acetone. The beer is extracted with three one-liter portions of methylene chloride and thereupon the acetone extracts and the extracts of the beer are combined, dried over anhydrous sodium sulfate and evaporated and the resulting residue chromatographed over a Florisil anhydrous magnesium silicate column. The chromatographic column is eluted with Skellysolve B hexanes plus increasing proportions of acetone of from five to twenty percent. The fractions thus obtained are evaporated to dryness leaving residues. The residues are subjected to infrared absorption analysis and those residues exhibiting the characteristic bands of 6α-fluoro-11-ketoestrone are combined and recrystallized from acetone-hexane to give 6α-fluoro-11-ketoestrone (III), a crystalline solid.

Instead of Septomyxa, species of other genera such as those disclosed in Example 1 can be used to convert 6α-fluoro-19-nor-4-androstene-3,11,17-trione to 6α-fluoro-11-ketoestrone.

EXAMPLE 8

6α-fluoroestradiol (III) (chemical dehydrogenation)

A mixture of 100 milligrams of 6α-fluoro-17β-hydroxy-19-nor-4-androsten-3-one (I) dissolved in six milliliters of tertiary butyl alcohol and 0.55 milliliter of acetic acid is heated together with thirty milligrams of selenium dioxide to approximately 75 degrees centigrade under stirring for a period of about 24 hours. Thereafter another thirty-milligram portion of selenium dioxide is added and the mixture heated under continuous stirring for a further period of about 24 hours. The mixture is then cooled, filtered and evaporated to dryness. The residue is dissolved in 75 milliliters of methylene chloride, washed with sodium bicarbonate solution, water, dried over sodium sulfate and the solvent is evaporated therefrom. The thus-obtained residue is chromatographed over a Florisil anhydrous magnesium silicate column. The chromatographic column is eluted with Skellysolve B hexanes plus increasing proportions of acetone of from five to twenty percent. The fractions thus obtained are evaporated to dryness leaving residues. The residues are subjected to infrared absorption analysis and those residues exhibiting the characteristic bands of 6α-fluoroestradiol are combined and recrystallized from methylene chloride-Skellysolve B hexanes to give 6α-fluoroestradiol (III), a crystalline solid.

Substituting 6α-fluoro-17β-hydroxy-19 - nor - 4 - androsten-3-one 17-acylates for 6α-fluoro-17β-hydroxy-19-nor-4-androsten-3-one is productive of the corresponding 6α-fluoroestradiol 17β-acylates, for example, the 17β-acetate, the 17β-propionate, the 17β-hemisuccinate, the 17β-benzoate, and the like.

EXAMPLE 9

6α-fluoro-11β-hydroxyestradiol (III) (chemical dehydrogenation)

A mixture of 100 milligrams of 6α-fluoro-11β,17β-dihydroxy-19-nor-4-androsten-3-one (I) dissolved in six milliliters of tertiary butyl alcohol and 0.55 milliliter of acetic acid is heated together with thirty milligrams of selenium dioxide to approximately 75 degrees centigrade under stirring for a period of about 24 hours. Thereafter another thirty-milligram portion of selenium dioxide is added and the mixture heated under continuous stirring for a further period of about 24 hours. The mixture is then cooled, filtered and evaporated to dryness. The residue is dissolved in 75 milliliters of methylene chloride, washed with sodium bicarbonate solution, water, dried over sodium sulfate and the solvent is evaporated therefrom. The thus-obtained residue is chromatographed over a Florisil anhydrous magnesium silicate column. The chromatographic column is eluted with Skellysolve B hexanes plus increasing proportions of acetone of from five to twenty percent. The fractions thus obtained are evaporated to dryness leaving residues. The residues are subjected to infrared absorption analysis and those residues exhibiting the characteristic bands of 6α-fluoro-11β-hydroxyestradiol are combined and recrystallized from methylene chloride-Skellysolve B hexanes to give 6α-fluoro-11β-hydroxyestradiol (III), a crystalline solid.

Substituting 6α - fluoro - 11β,17β - dihydroxy - 19-nor-4-androsten-3-one 17-acylates for 6α-fluoro-11β,17β-dihydroxy-19-nor-4-androsten-3-one is productive of the corresponding 6α-fluoro-11β-hydroxyestradiol 17β-acylates, for example, the 17β-acetate, the 17β-propionate, the 17β-hemisuccinate, the 17β-benzoate, and the like.

EXAMPLE 10

The 6β-epimers

Substituting 6β - fluoro - 11β - hydroxy - 4 - androstene-3,17-dione for the starting material in Example 1 but maintaining near neutral reaction conditions there is produced 6β-fluoro-11β-hydroxy-1,4-androstadien-3,17-dione.

Substitution of the corresponding 6β-fluoro starting steroid for the 6α-fluoro starting steroid of Examples 2 through 9 and maintenance of near neutral reaction conditions is productive of the corresponding 6β-fluoro steroid end-product, such as, for example, 6β-fluoro-1,4-androstadiene-3,11,17-trione (Example 2), 6β-fluoro-17β-hydroxy-1,4-androstadiene-3,11-dione (Example 3), 6β-fluoro - 17β - hydroxy - 1,4 - androstadiene - 3,11 - dione 17-propionate (and other 17-acylates thereof) (Example 3A), 6β - fluoro - 17β - hydroxy - 1,4 - androstadiene - 3-one (and the 17-acylates thereof) (Example 4), 6β-fluoro-11β,17β - dihydroxy - 1,4 - androstadien - 3 - one (and the 17-acylates thereof) (Example 5), 6β-fluoroestrone (Example 6), 6β-fluoro-11-ketoestrone (Example 7), 6β-fluoroestradiol (and the 17β-acylates thereof) (Example 8) and 6β-fluoro-11β-hydroxyestradiol (and the 17β-acylates thereof) (Example 9).

EXAMPLE 11

Isomerization of the 6β-fluoro steroids to the corresponding 6α-fluoro steroids Illustratively, this reaction is carried out as follows:

A solution of one gram of 6β-fluoro-11β-hydroxy-1,4-androstadiene-3,17-dione in 100 milliliters of chloroform and 0.1 milliliter of alcohol is cooled to approximately minus ten degrees in an ice-salt bath and a stream of anhydrous hydrogen chloride is greatly bubbled through the solution for about 2.5 hours whilst maintaining the temperature between approximately minus five and minus fifteen degrees centigrade. The solution is then washed with dilute sodium bicarbonate solution and water, dried over anhydrous sodium sulfate, and evaporated under reduced pressure. Crystallization of the residue from acetone-Skellysolve B hexanes yields 6α-fluoro-11β-hydroxy-1,4-androstene-3,17-dione, of Example 1.

In a similar manner other 6β-fluoro steroids, for example, 6β-fluoro-1,4-androstadiene - 3,11,17 - trione, 6β-fluoro - 17β - hydroxy - 1,4 - androstadiene - 3,11 - dione (and the 17-acylates thereof), 6β-fluoro-17β-hydroxy-1,4-androstadien-3-one (and the 17-acylates thereof), and 6β - fluoro - 11β,17β - dihydroxy - 1,4 - androstadiene-3-one (and the 17-acylates thereof) can be converted to their corresponding 6α-analogues.

This application is a continuation-in-part of application Serial No. 716,026, filed February 19, 1958, which is in turn a continuation-in-part of application Serial No. 699,505, filed November 29, 1957, now abandoned.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A 6-fluoro-1-dehydro compound of the following formula:

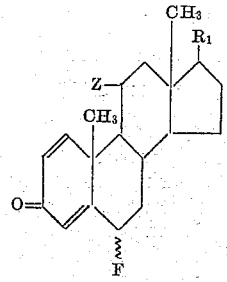

wherein $R_1$ is selected from the group consisting of hydroxyl, OAcyl, and keto, and term Acyl representing the acyl radical of a hydrocarbon carboxylic acid containing from one to twelve carbon atoms, inclusive, and Z is selected from the group consisting of hydrogen, hydroxyl, and keto.

2. 6-fluoro-17β-hydroxy-1,4-androstadien-3-one.
3. 6α-fluoro-17β-hydroxy-1,4-androstadien-3-one.
4. 6-fluoro-1,4-androstadiene-3,17-dione.
5. 6α-fluoro-1,4-androstadiene-3,17-dione.
6. 6-fluoro-17β-hydroxy-1,4-androstadiene-3,11-dione.
7. 6α-fluoro-17β-hydroxy-1,4-androstadiene-3,11-dione.
8. 6-fluoro-1,4-androstadiene-3,11,17-trione.
9. 6α-fluoro-1,4-androstadiene-3,11,17-trione.
10. 6-fluoro-11β-hydroxy-1,4-androstadiene-3,17-dione.
11. 6α - fluoro - 11β - hydroxy-1,4-androstadiene - 3,17-dione.
12. 6-fluoro-11β,17β-dihydroxy-1,4-androstadien-3-one.
13. 6α-fluoro - 11β,17β - dihydroxy-1,4-androstadien-3-one.
14. 6-fluoro-17β-hydroxy-1,4-androstadien-3-one 17-acylate in which the acyl radical is that of a hydrocarbon carboxylic acid containing from one to twelve carbon atoms, inclusive.
15. 6α-fluoro-17β-hydroxy-1,4-androstadiene-3-one 17-propionate.
16. 6-fluoro - 11β,17β - dihydroxy-1,4-androstadiene-3-one 17-acylate in which the acyl radical is that of a hydrocarbon carboxylic acid containing from one to twelve carbon atoms, inclusive.
17. 6α-fluoro - 11β,17β - dihydroxy-1,4-androstadien-3-one 17-propionate.
18. 6-fluoro-17β-hydroxy-1,4-androstadiene-3,11-dione 17-acylate in which the acyl radical is that of a hydrocarbon carboxylic acid containing from one to twelve carbon atoms, inclusive.
19. 6α-fluoro-17β-hydroxy-1,4-androstadiene-3,11-dione 17-propionate.
20. A 6-fluoro compound of the following fomula:

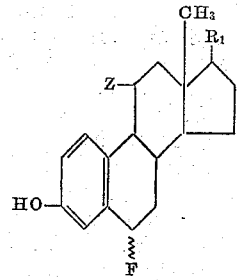

wherein $R_1$ is selected from the group consisting of hydroxyl, OAcyl, and keto, the term Acyl representing the acyl radical of a hydrocarbon carboxylic acid containing from one to twelve carbon atoms, inclusive, and Z is selected from the group consisting of hydrogen, hydroxyl, and keto.
21. 6-fluoroestradiol.
22. 6α-fluoroestradiol.
23. 6-fluoro-11-ketoestradiol.
24. 6α-fluoro-11-ketoestradiol.
25. 6-fluoro-11β-hydroxyestradiol.
26. 6α-fluoro-11β-hydroxyestradiol.
27. 6-fluoroestrone.
28. 6α-fluoroestrone.
29. 6-fluoro-11-ketoestrone.
30. 6α-fluoro-11-ketoestrone.
31. 6-fluoro-11β-hydroxyestrone.
32. 6α-fluoro-11β-hydroxyestrone.
33. 6-fluorestradiol 17β-acylate in which the acyl radical is that of a hydrocarbon carboxylic acid containing from one to twelve carbon atoms, inclusive.
34. 6α-fluoroestradiol 17β-propionate.
35. 6-fluoro-11-ketoestradiol 17β-acylate in which the acyl radical is that of a hydrocarbon carboxylic acid containing from one to twelve carbon atoms, inclusive.
36. 6α-fluoro-11-ketoestradiol 17β-propionate.
37. 6-fluoro-11β-hydroxyestradiol 17β-acylate in which the acyl radical is that of a hydrocarbon carboxylic acid containing from one to twelve carbon atoms, inclusive.
38. 6α-fluoro-11β-hydroxyestradiol 17β-propionate.

No references cited.

UNITED STATES PATENT OFFICE

Certificate of Correction

Patent No. 2,867,630

January 6, 1959

Raymond L. Pederson et al.

It is hereby certified that error appears in the printed specification of the above numbered patent requiring correction and that the said Letters Patent should read as corrected below.

Column 3, line 23, for "trifluorocetic" read —trifluoroacetic—; column 4, lines 34 and 35, for that portion of the formula reading "-dihydroxy-9-nor-4-" read —-dihydroxy-19-nor-4- —; column 7, line 72, for that portion of the formula reading "-17α-hydroxy-" read —-17β-hydroxy- —.

Signed and sealed this 12th day of May 1959.

[SEAL]

Attest:
KARL H. AXLINE,
*Attesting Officer.*

ROBERT C. WATSON,
*Commissioner of Patents.*